United States Patent
Doht et al.

[19]

[11] Patent Number: 6,011,708
[45] Date of Patent: Jan. 4, 2000

[54] METHOD AND DEVICE FOR CONTROLLING THE WORKING POINTS OF A SERIES-RESONANT-CIRCUIT INVERTER

[75] Inventors: Hans-Christian Doht; Gunther Birk, both of Erlangen, Germany

[73] Assignee: Siemens Aktiengesellschaft, München, Germany

[21] Appl. No.: 08/210,979

[22] Filed: Mar. 21, 1994

[30] Foreign Application Priority Data

Mar. 22, 1993 [DE] Germany .............................. 43 09 163

[51] Int. Cl.[7] ............................................. H02M 3/24
[52] U.S. Cl. ............................................. 363/98; 363/132
[58] Field of Search ................................. 363/40, 41, 95, 363/97, 98, 132

[56] References Cited

U.S. PATENT DOCUMENTS

| 4,951,185 | 8/1990 | Schutten et al. | 363/17 |
| 4,969,076 | 11/1990 | Schutten et al. | 363/17 |
| 5,285,372 | 2/1994 | Huynh et al. | 363/132 |

*Primary Examiner*—Shawn Riley
*Attorney, Agent, or Firm*—Kenyon & Kenyon

[57] ABSTRACT

A method and a device may be used for controlling the working points of a series-resonant-circuit inverter. The frequency of the inverter is controlled as a manipulated variable in dependence upon a defined phase-angle system deviation in such a way that a determined phase-angle actual value of a measurable state variable of the load circuit, whose phase-frequency characteristic has a monotonically falling curve, corresponds to a specifiable phase-angle setpoint value. Thus, a method and a device are implemented for controlling the working points of a series-resonant-circuit inverter, by which means the operating range prescribed for the series-resonant-circuit inverter is detected and kept stable independently of parameter fluctuations of the resonant circuit elements.

18 Claims, 6 Drawing Sheets

METHOD AND DEVICE FOR CONTROLLING THE WORKING POINTS OF A SERIES-RESONANT-CIRCUIT INVERTER

BACKGROUND OF THE INVENTION

The invention relates to a method and a device for controlling the working points of a series-resonant-circuit inverter.

Inductive heating is frequently used to transfer power to moving heating material. The operation is fairly simple. An alternating magnetic field produces eddy currents in electrically conductive material, and the electric losses in the heating material cause it to be heated. To produce the alternating magnetic field, an inductor is necessary which is fed by an alternating source. The transferred effective power is dependent upon the frequency of excitation and the exact load conditions (of the inductor together with the heating material). The frequency range is selected not only according to feasibility, but also according to the particular application. Because of the current displacement effect, also known as a "Heaviside" or "proximity" effect, higher frequencies cause the heating material surface to be heated. Lower frequencies have a larger penetration depth and thus heat the volume of the material. One application is the heating of rotating rollers in the calendar of paper manufacturing machines.

Converters are used as voltage supplies for such a system, and the term generally encompasses both rectifiers and inverters. For high frequencies, valve inverters are often used. The efficiency of this design is low due to the valve losses ($\eta \approx 70\%$). High-capacity semiconductors are a useful alternative. When properly triggered, they demonstrate low switching and forward power losses. In order to prevent an overload of the circuit elements, however, specific operating conditions must be adhered to. The principal task of open-loop and closed-loop control electronics is, on the one hand, the guarantee of a specific operating range and, on the other hand, the control of one or several performance quantities.

Series-resonant systems are often fed by a converter in order to remove load from the circuit elements. When such a series-resonant-circuit inverter is triggered with frequencies within the range of the self-resonance point, only small currents or voltages occur in the switching instant. Thus, the switching losses are considerably reduced. Departing from the defined operating range leads to a considerable increase in the losses. In some situations, this may destroy the switches.

In the paper, Senderöhre, Thyristor oder Mosfet im Frequenz-wandler für das induktive Randschichthärten und ihr Einfluß auf die Anwendungstechnik [Transmitter Valves, Thyristors or MOSFETs (metal-oxide-semiconductor field effect transistors) in a Frequency Converter for Inductive Edge-Layer Hardening and their Effect on Application Engineering], in the German periodical "Elektrowärme International" [Electroheating International], 47 (1989), B4, August, pp. B192–B201, different frequency converter designs are analyzed with respect to their advantages and disadvantages as power sources for inductive edge-layer hardening. The paper also examines electric and electronic phenomena in conjunction with industrial-process and application engineering. The efficiency of the frequency conversion is highest when MOSFETs and thyristors are used. Values greater than 90% may be easily achieved. As a rule, a conventional valve generator survives an inductor failure without suffering any consequential damage. Generally, an anti-resonant circuit inverter with symmetrical thyristors reacts in a problem-free manner to such a breakdown. On the other hand, in the case of converters with transistors, an inductor failure can cause semiconductor components to break down.

The paper, Resonanzumrichter im Mittelfrequenzbereich [Resonance Converters in the Middle-Frequency Range], in the German periodical "etz", Volume 110 (1990), Issue 18, pp. 948–953, introduces, inter alia, series-resonant-circuit inverters and anti-resonant-circuit inverters. In the case of the series-resonant-circuit inverter, a rectangular characteristic curve results as an exciting voltage u, also called an excitation voltage, over the resonant circuit. The frequency of the exciting rectangular square wave oscillation can lie above or below the resonant frequency of the resonant circuit. If the resonant-circuit inverter is operated with non-disconnectible power semiconductors, then an operating frequency must be selected below the resonant frequency. If disconnectible power semiconductors are available, then the series resonant circuit can also be excited above the resonant frequency. An operating point within this range is advantageous, since the current-breaking performance of the diodes is then no longer significant. As a result of the reduction in switching losses, the operating frequency can be raised up to the range of a few hundred kHz. The current in the power semiconductor then exhibits the shape of a half-wave, which begins during the making operation with a negative instantaneous value and ends during the breaking operation with a positive value.

Shifts in the self-resonance point caused by parameter changes in the resonant circuit must be detected by the closed-loop control and treated appropriately. Such fluctuations occur to a large extent during inductive heating. They result, on the one hand, from the temperature dependence of the ohmic resistance of the material and, on the other hand, from the changes in the magnetic properties. For example, the relative permeability of ferromagnetic materials varies by factors of ten when the Curie temperature is exceeded. The material then behaves diamagnetically. This change has a direct effect on the reactance of the heating material, and thus on the impedance across the inductor terminals. In some applications, short-circuiting of the inductor also occurs.

In steady-state operation, the closed-loop control of a series-resonant-circuit inverter is supposed to adjust the performance capacity of the inductor to the setpoint values. Different quantities can be drawn upon to determine power output capacity, such as incoming power, resonant-circuit power, temperature of the workpiece, or even the gap thickness between the rollers of a paper manufacturing machine. For reliability, malfunctions in the steady-state operation (transient operations and parameter fluctuations) must be controlled.

In the open-loop and closed-loop control of a converter having a two-storage system as a load circuit, there exist easily calculable relations between the excitation and the internal state variables of the system. Possible control processes, such as controlling the transistor conducting period, controlling the diode conducting period, controlling the capacitor voltage, and frequency control are known, for example, from the literature:

i. R. Oruganti, F. C. Lee Resonant Power Processors: Part II—Methods of Control, IEEE IAS Annual Meeting, Proceedings 1984, pp. 868–878 ii. R. Oruganti, F. C. Lee Resonant Power Processors: Part I—State Plane Analysis, IEEE IAS Annual Meeting, Proceedings 1984, pp. 860–867 iii. S. W. H. de Haan, H. Huisman Novel Operation and Control Modes for Series-Resonant Converters, *IEEE*

*Transactions On Industrial Electronics,* vol. 32, no. 2, May 1985, pp. 150–157

Because of the complex relations and the high degree of complexity of the measuring and automatic control electronics, a working-point control is often undertaken by means of an open-loop or closed-loop control of frequency. In this case, often only a relevant state variable finds application as an input variable. If a parameter of the resonant circuit changes during operation, the operating ranges likewise shift. In the case of a frequency control which presupposes specific resonant-circuit parameters, the danger exists that there will be a departure from the established working point. In some instances, then, the point of maximum capacity can no longer be reached.

The paper, Solid State RF Generators for Induction Heating Applications, printed in *IEEE IAS,* 1982, Conference Record 1982, pp. 939–944, introduces a semiconductor inverter for induction heating. The inverter contains four power MOSFETs, which make up an H-bridge, to whose output terminals is linked a two-storage system as a load circuit. A controlling system is used to regulate the load current, two variable restrictions being provided. The one variable restriction compares the capacitor voltage to a limiting value. The voltage deviation is supplied via an integrator and a Schmitt trigger to the current-system deviation. The other variable restriction utilizes the phase-angle actual value between the load current and the excitation voltage of the inverter. This is compared to a phase-angle setpoint value. A phase-angle deviation is likewise supplied via a Schmitt trigger to the current-system deviation. The phase-angle actual value is determined, by means of an exclusive OR gate having a downstream smoothing element, on the basis of a measured load current and the control signals, in conjunction with a delay. It may be that this closed-loop control guarantees that there is never a departure from the operating range. However, the degree of complexity required for this control is considerable. Also, this control does not permit power to be controlled to a constant value in the case of a parameter fluctuation.

SUMMARY OF THE INVENTION

The present invention relates to a method and a device for controlling the working points of a series-resonant-circuit inverter, which will allow the operating range prescribed for the series-resonant-circuit inverter to be detected and kept stable independent of parameter fluctuations of the resonant circuit elements.

The frequency of the inverter is controlled in dependence upon a defined phase-angle system deviation. A determined phase-angle actual value of a measurable state variable of the load circuit, whose phase-frequency characteristic has a monotonically falling curve, corresponds to a specifiable phase-angle setpoint value.

Because the phase shift between a state variable of the load circuit of the series-resonant-circuit inverter and the excitation voltage supplies a unique signal for detecting the maximum power as a function of the switching frequency of the inverter, it is possible, in dependence upon the controlled variable "phase angle", to detect shifts in the self-resonance point in an error-free manner. As a result, it is possible for the working point of the inverter to be monitored even in the case of marked load changes, for example, in the event that the Curie temperature is exceeded. A setpoint selection, made when controlling the phase of a state variable, is determined by the effective power output by the series-resonant-circuit inverter.

Which state variable of the load circuit is used for phase control depends upon its phase-frequency characteristic.

Since the phase-frequency characteristic of a state variable in the case of a two-storage system can have a different profile than in the case of a three-storage system, the selection of the state variable is, in part, dependent upon the number of storage devices. The phase-frequency characteristic of a state variable is dependent, as well, upon the type of storage devices (capacitors, inductors, etc.) and their configuration in a network. Moreover, the allocation of the maximum power to a phase angle of a state variable is dependent upon the quality of the resonant circuit. With declining quality, the maximum power shifts to larger phase-angle values.

The present invention enables the operating range prescribed for the resonant-circuit to be monitored and stabilized, independently of the parameter fluctuations of the resonant-circuit elements.

The method according to an embodiment of the present invention utilizes a comparator with a working-point controller, a phase detector, and a frequency detector. The negative input of the comparator is linked to the output of the phase detector, and a first frequency input of the controller is linked to the output of the frequency detector. The state variable of the load circuit, whose phase-frequency characteristic is monotonically decreasing, is connected to both detectors. Moreover, the excitation voltage of the inverter is applied to a second input of the phase detector. A phase-angle setpoint value is supplied to the positive input of the comparator. The output signal of the comparator is fed back to the second frequency input of the controller.

The method of the present invention is thus realized by determining a phase-angle actual value of a measurable state variable of a load circuit, where the variable has a phase-frequency characteristic that is monotonically decreasing. This measurable state variable may be, for example, the load current of a two-storage system, or may be the capacitor voltage of a three-storage system. Then a phase-angle setpoint is set corresponding to the above phase-angle actual value. A deviation is then defined, based on the above two phases, and the frequency of an inverter is then adjusted to correspond to this deviation.

In so doing, the phase-angle setpoint may be set by a master power control. It may also be set so as to depend on the excitation voltage generated by the inverter and the state variable.

The device according to an embodiment of the present invention generally includes a comparator, a working-point controller, a phase detector, a frequency detector, a load circuit, and an inverter. It may also include proportional elements within the working-point controller. Precontrol values of the working point may also be applied. The above phase detector may include an exclusive OR gate, as well as various smoothing elements.

The device of the present invention may be realized as part of a system including a source of three-phase alternating current power, an intermediate circuit, an inverter, and a load circuit. In this embodiment the inverter frequency may be controlled such that a phase-angle actual value of a measurable state variable of the load circuit corresponds to a specifiable phase-angle setpoint value. In this embodiment a transformer may be used to process the power source. Furthermore, a rectifier may be used after the transformer, either controlled or uncontrolled. The load circuit may include an inductor. As before, the measurable state variable has a generally decreasing phase-frequency characteristic. For example, the capacitance of a load circuit may advantageously be used.

Because the phase angle of a state variable of the load circuit can be used as a controlled variable for controlling the working point of a series-resonant-circuit inverter, one can obtain an especially simple working-point controller, which is subordinate, in particular, to a power controller of the series-resonant-circuit inverter.

DETAILED DESCRIPTION

Figure 1:
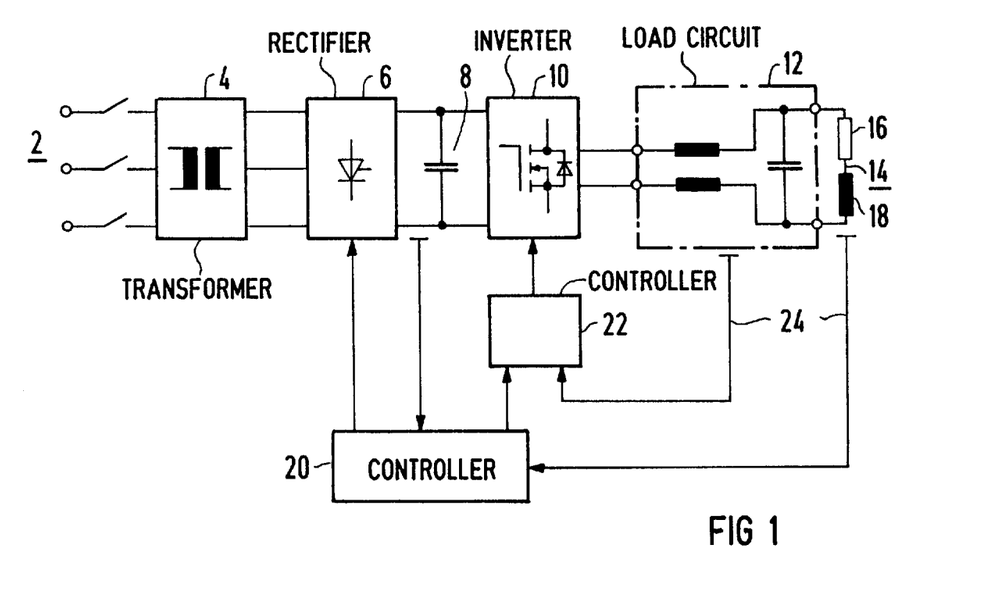
FIG. 1 shows a block diagram of a HF-supply source of an inductor.

In the embodiment of FIG. 1, a direct voltage having a variable level is generated from a three-phase alternating current (A.C.) power supply 2 via a transformer 4 and a controllable rectifier 6. This voltage is smoothed and buffered in the intermediate circuit 8.

The voltage is subsequently transformed by a high-frequency transistor-inverter 10 into a pulse-shaped a.c. voltage. This is fed via a transformation circuit 12 to an inductor circuit 14, which is represented in the equivalent circuit diagram by a resistor 16 and an inductor 18. The load circuit, consisting of the transformation circuit 12 and the inductor circuit 14, makes up a series resonant circuit having three energy stores. The load circuit used here is described in detail in German Patent Application P 4 133 981.9.

Controlling systems 20 and 22 are provided for the controlled rectifier 6 and the inverter 10. These controlling systems are supplied with the actual values from the series resonant circuit via lines 24, which is made up of the inductor circuit 14 and the transformation circuit 12. In addition to these actual values, other measurable quantities, such as the temperature of the workpiece, etc., can be drawn upon for the closed-loop control.

Figure 2:
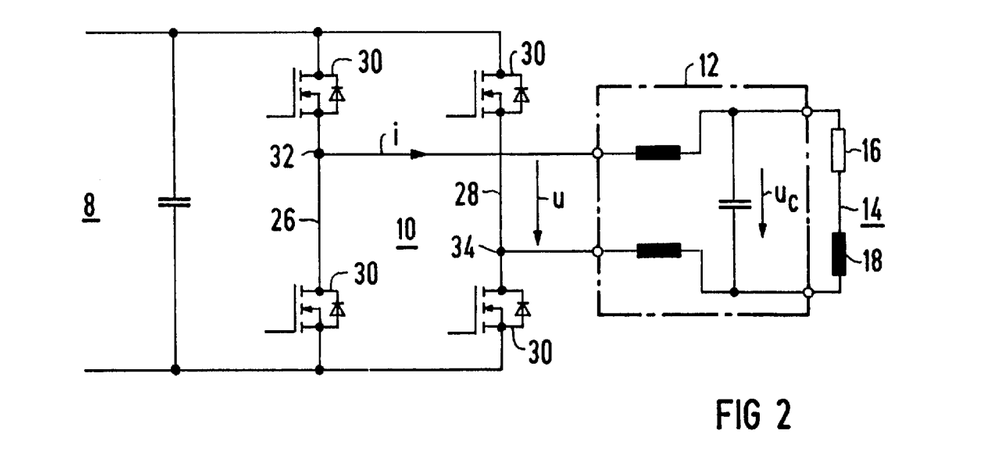
FIG. 2 shows one section of the block diagram of FIG. 1 in greater detail.

As may be seen from the embodiment of FIG. 2, the inverter 10 consists of two bridge arms 26 and 28, which each have a power MOSFET 30, in particular a self-locking MOSFET, in each bridge half. These power MOSFETs 30 each have an internal diode, also called an inverse diode. At the output terminals 32 and 34 of the high-frequency inverter 10, the transformation circuit 12 is linked to the output-side inductor circuit 14. The inverter output current i, also called the load current, and the inverter output voltage u, also called the excitation voltage, are each depicted in a diagram with respect to time t for the below-resonant operation ($\phi>0$) in FIGS. 3 and 4, and for the above-resonant operation ($\phi<0$) in FIGS. 5 and 6.

Figure 3:
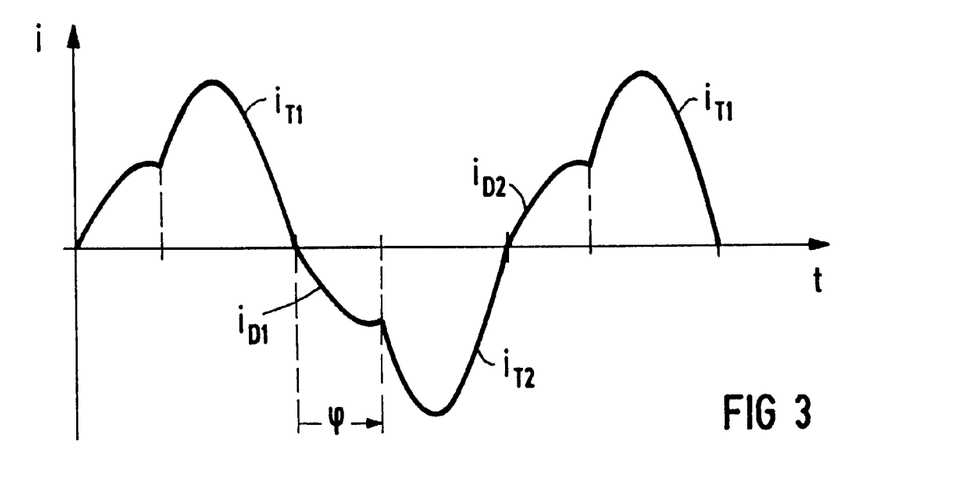
FIGS. 3 and 4 show the current and voltage of an inductor in below-resonant operation, in each case with respect to time t.
Figure 4:
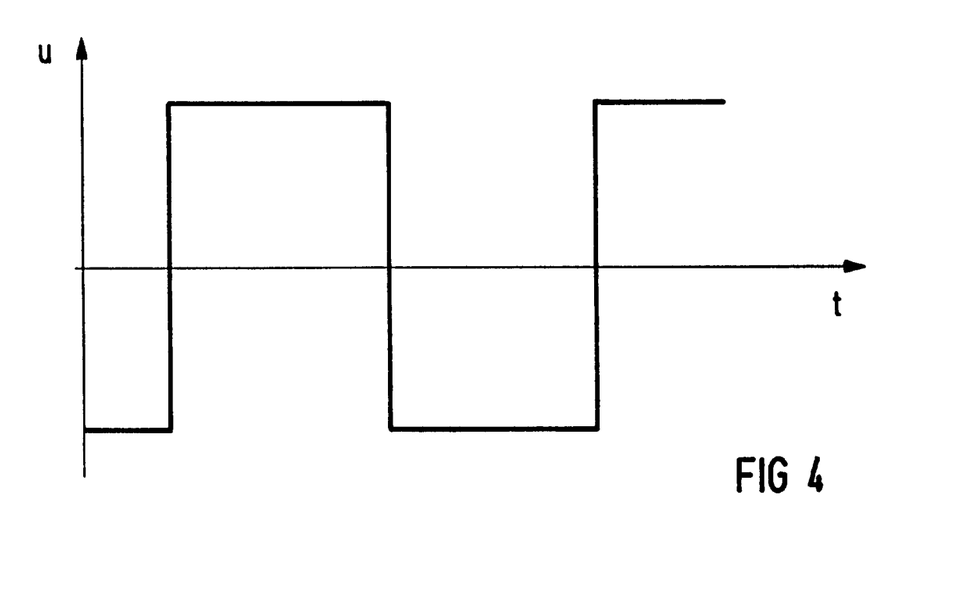

In below-resonant operation, a capacitive phase shift ($\phi>0$) exists between the inverter output voltage u and the load current i. In this capacitive phase shift, the current conduction ends with a diode current $i_{D1}$ or $i_{D2}$. The commutation sequence, transistor—counter-diode is characteristic of this capacitive phase shift. In this operating mode, the converter diodes must often be decommutated from the opposite power MOSFETs 30.

In a half-bridge arm on the intermediate circuit 8, rapid switching to a flooded diode often leads to destructive overvoltages across the power semiconductors. These are caused by the interruption of the decommutated diode and the parasitic terminal inductances of the power semiconductor. Due to these circumstances, power MOSFETs, in particular, are considerably restricted in their operating range. Even exceeding the highest permissible drain/source voltage for a short-term, eg., for 1 to 2 ns, may result in the failure of the component.

Figure 5:
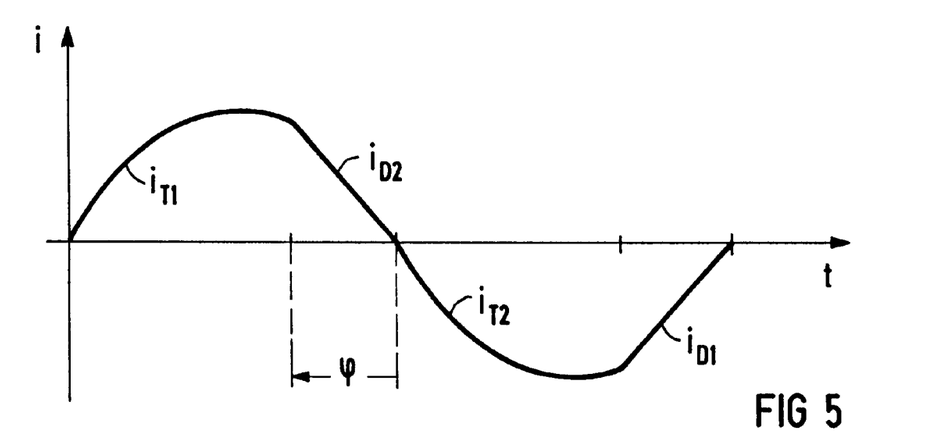
FIGS. 5 and 6 shows the current and voltage of an inductor in above-resonant operation, in each case with respect to time t.
Figure 6:
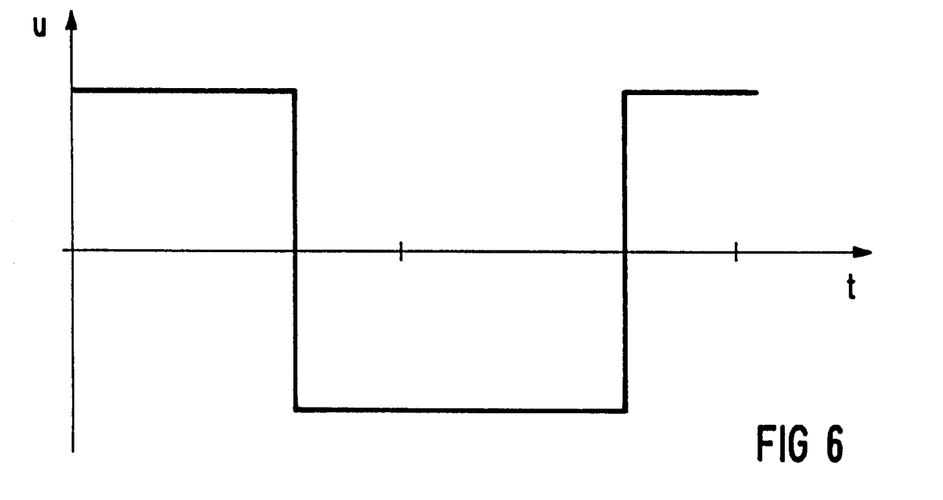

In above-resonant operation, an inductive phase ($\phi<0$) exists between the inverter output voltage u and the load current i. In the case of this inductive phase shift, the current conduction begins with a diode current $i_{Di}$ or $i_{D2}$. The commutation sequence, counter diode—transistor is characteristic of this inductive phase shift. In this operating mode, the current commutates from an inverse diode to the corresponding transistor, through which a diode interruption and its effects no longer occur.

Figure 7:
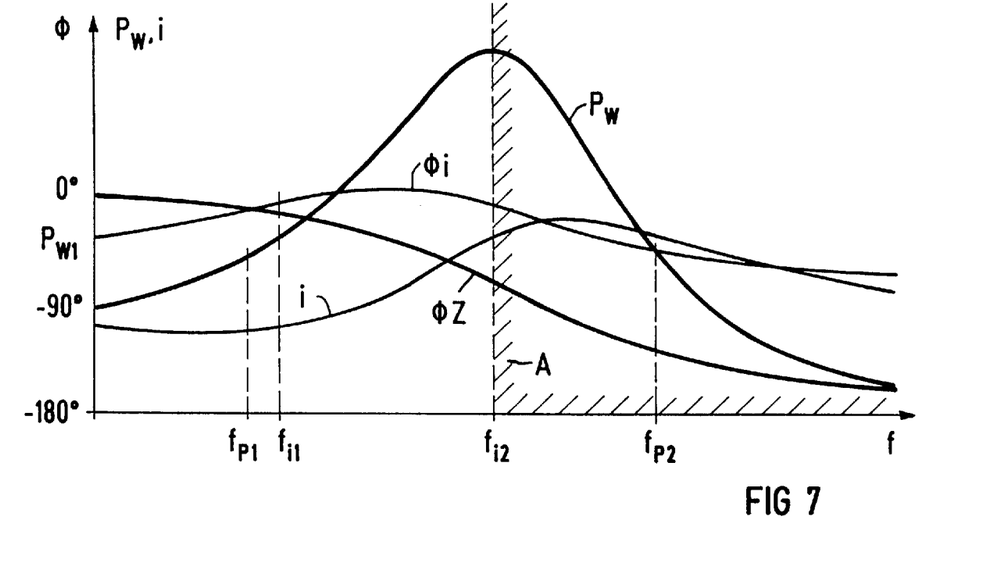
FIG. 7 shows a diagram of phase with respect to the frequency f. The phases shown are those characteristic of the load current and of the capacitor voltage relative to the power curve.

Plotted in a diagram with respect to frequency f, FIG. 7 shows the frequency response characteristics of: load current i; effective power $P_W$; phase $\Phi i$ of the load current i; and phase $\Phi Z$ of a state variable Z of a three-storage system. Given frequencies above the effective-power maximum, the effective power behaves strictly monotonically in dependence upon the frequency. In order that no reversal of the control direction occurs during the closed-loop control, the frequency response characteristics must be monotonically falling or rising.

Figure 8:
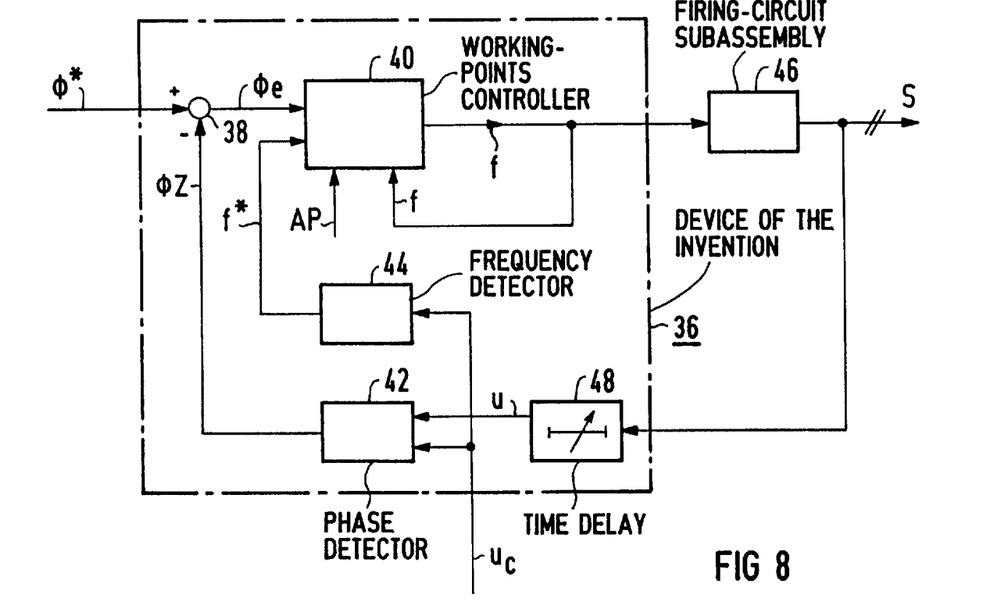
FIG. 8 shows a block diagram of a device according to the invention for implementing the method for controlling the working point.

The frequency response characteristic of the phase $\Phi i$ of the load current i exhibits a maximum, so that two frequency values $f_{i1}$ and $f_{i2}$ exist for one phase-angle value $\Phi=0°$. In the same way, the point of maximum power no longer coincides with the phase relation $\Phi=0°$ (the phase between output voltage u and load current i). The positive current phase $\Phi i$ characterizes the capacitive range of the transformation circuit 12. As a consequence, besides high switching losses, the steady-state operation leads to the occurrence of overvoltages, because of the existence of parasitic inductances. Overvoltages may cause the peak blocking voltage of the MOSFET 30 of the inverter 10 to be exceeded and, thus, may lead to the destruction of the component. Therefore, an operation within the capacitive range must be inhibited. For these reasons, the operating range A is defined for frequencies above the self-resonance point. The device 36, which is depicted in greater detail in FIG. 8, is responsible for the adherence to such an operating range A. This device is explained in more detail later.

One cannot simply define a low frequency limit. This is because, as shown from the frequency response characteristic, the effective power $P_W$ does not represent any reversible and unique function of the frequency f. As a rule, two frequencies, $f_{P1}$ and $f_{P2}$, can be assigned to one effective power value $P_{W1}$. Since the intention is to avoid below-resonant switching, and since determining the actual power value does not make it possible for one working point AP1 or AP2 to be uniquely assigned to the below- or above-resonant range, this actual power value is not a controlled variable. To a large extent, parameter fluctuations on the inductor circuit 14 influence the position of the maximum power on the frequency scale. Thus, it is not possible to simply restrict the operating range A through the application of a lower frequency limit.

In accordance with this diagram, the phase $\Phi Z$ of a state variable Z is strictly monotonically falling in dependence upon the frequency f for the transformation and for the specified operating range A. The frequency, at which the maximum power of an inductor circuit 14 having an inductor quality of Q=5 and greater is injected, is not more than the frequency at which a phase displacement of $\Phi Z=-90°$ occurs. However, the value $\Phi Z=-90°$ applies only in the undamped case. For inductor qualities $Q \geq 5$ that are relevant in practice, the maximum power can be formulated with sufficient accuracy given a phase value of $\Phi Z=-90°$. In the case that the parameters of the resonant circuit are changing, the maximum power stays together with the phase value $\Phi Z=-90°$. In the case of smaller qualities Q of the resonant circuit, the maximum power shifts to larger phase values ($-90°<\Phi Z<0°$). Thus, when the critical value $\Phi Z=-90°$, the operating range A is able to be limited at the maximum of the power $P_W$. When a three-storage system is used as a load circuit, the phase $\Phi Z$, as a function of the frequency f, represents the phase difference between a capacitor voltage $u_C$ and the output voltage u of the inverter 10.

By means of this phase-frequency characteristic $\Phi Z$, a unique assignment of the effective power and of the frequency is possible, in which case a reversal of the control direction is also avoided.

The Working Points Controller

FIG. 8 depicts a block diagram of an embodiment of a device 36 for implementing the method of the invention for controlling the working points of a series-resonant-circuit inverter. Device 36, for example, may perform the function of controller 22 in FIG. 1. This device 36 includes a comparator 38 with a downstream working-point controller 40, a phase detector 42, and a frequency detector 44. Applied to the positive input of the comparator 38 is a phase-angle setpoint value $\Phi^*$, which is advantageously generated by a master power control (not shown). The negative input of the comparator 38 is linked to an output of the phase detector 42. On the output side, the comparator 38 is connected to a phase input of the working-point controller 40. A specific embodiment of the working-point controller 40 is depicted in greater detail in FIG. 9. A first frequency input of the working-point controller 40 is connected to the output of the frequency detector 44, at whose input is applied a state variable Z of the load circuit. Because, in the case of a three-storage system as a load circuit, the phase-frequency characteristic $\Phi Z$ of the capacitor voltage $u_C$ is monotonically falling, it may be advantageously used as a state variable Z. This capacitor voltage $u_C$, which is depicted in the diagram according to FIG. 10 with respect to time t, is likewise applied to an input of the phase detector 42. The output voltage u of the inverter 10 is applied to the other input of this phase detector 42. This output voltage u is also depicted with respect to time t in FIG. 10. Output voltage u may be measured by means of a measuring element, and, as shown in FIG. 8, may be alternatively generated from the switching signals S at the output of a firing-circuit subassembly 46 and from a time-delay element 48. The output of the working-point controller 40 leads, on the one hand, to the firing-circuit subassembly 46 and, on the other hand, to a second frequency input of the working-point controller 40. Moreover, a working-point precontrol value AP may be fed to the working-point controller 40. Thus, to control working points, this advantageous embodiment requires only one measurable state variable Z, which often is already available.

The Phase Detector

The arrangements that employ metrological means to detect the phase difference usually have a significant characteristic dynamic response. In the present case, the phase displacement $\Phi Z$ between the square-wave output voltage u and the virtually sinusoidal capacitor voltage $u_C$ is supposed to be defined. The time difference between two zero crossings multiplied by the circuit frequency ω of the signals u and $u_C$ produces the phase. Possible realizations of phase detectors 42 are now discussed, and their characteristic dynamic response and suitability for the present application are examined.

The digital plotting of the phase difference $\Phi Z$ takes place at an operating frequency of 400 kHz, at a resolution of 7 bits and with the display range from 0° to 180°, i.e., there is a counting difference of over 100 MHz. The time between two zero crossings is multiplied by the operating frequency f to get the phase. This embodiment is made possible by the design in Emitter-Coupled-Logic (ECL). However, in this example, the digital design of the detector 42 is quite expensive due to the ensuing computing times. Moreover, a digital-to-analog converter must be provided for the further analog processing of the signals. For that reason, analog methods for acquiring the actual value of the phase displacement $\Phi Z$ are preferred here.

Analog phase detectors can be realized as multiplying or sequential built-on accessories. Both manners of detection produce a harmonic-wave-encumbered signal, whose steady component constitutes a measure for the phase difference $\Phi Z$.

The multiplying type includes a downstream low-pass filter to suppress the alternating component. This type of phase detector can include an analog multiplier and an appropriate smoothing of the signal. The steady component of the output signal represents the phase difference that is mapped by means of a cosine function. Analog multipliers can be obtained with corner (transition) frequencies of 100 MHz. In the case of the operating frequency of 400 kHz specified as an example above, the dynamic response of such an actual-value acquisition is dependent only upon the time response of the low-pass filter.

Sequential phase detectors only take into consideration the position of the zero crossings of both input signals u and $U_C$ on the time axis. The curve of the time functions does not have an effect on the acquired phase signal. The sequential phase detector consists of a switching-type element, which reacts to the zero crossings of the input signals. The circuit elements can be realized with an exclusive OR gate, an exclusive NOR gate, an AND gate, or a NAND gate. Two periodic functions at the input of a gate supply a signal to its output. The steady component of the signal corresponds to the phase difference. The alternating component must be suppressed by means of a downstream low-pass filter, as in the case of multiplying detectors. An applied exclusive OR gate has a range of values from 0° to 180°, in which the mapping of the phase on the steady component of the gate output is linear and unique. Thus, the entire occurring region of phase is covered for the given load circuit, e.g., a series resonant circuit having three energy stores.

Figure 11:
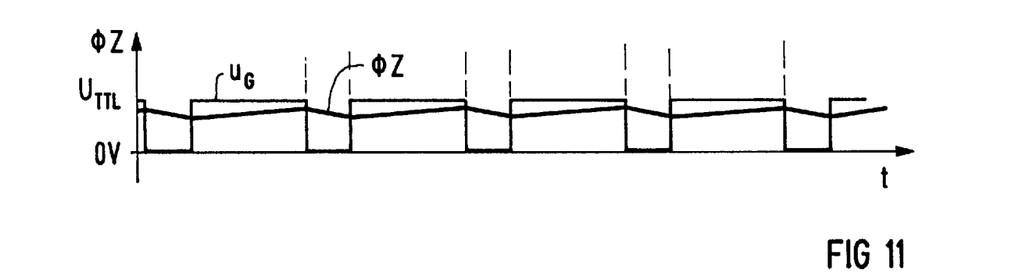
FIG. 11 shows a gate-output signal from the phase detector and the phase-angle actual value with respect to time t.

The output signal $U_G$ (FIG. 11) of the gate is smoothed by means of a low-pass filter. The fundamental wave of the alternating component at the output of the exclusive OR gate oscillates with double the frequency of the input signals. The amplitude of the alternating component is as large as the entire output voltage level. For the smoothing operation, a simple RC-filter may be used. The output signal from the filter, the phase-angle actual value $\Phi Z$, is depicted in FIG. 11 in a diagram with respect to time t.

A monoflop having a downstream smoothing element is provided as a frequency detector 44. It converts the capacitor voltage $u_C$ into a frequency f, which serves as a frequency-setpoint value for the working-point controller 40. In addition, a Schmitt trigger can be used in place of a monoflop.

Figure 9:
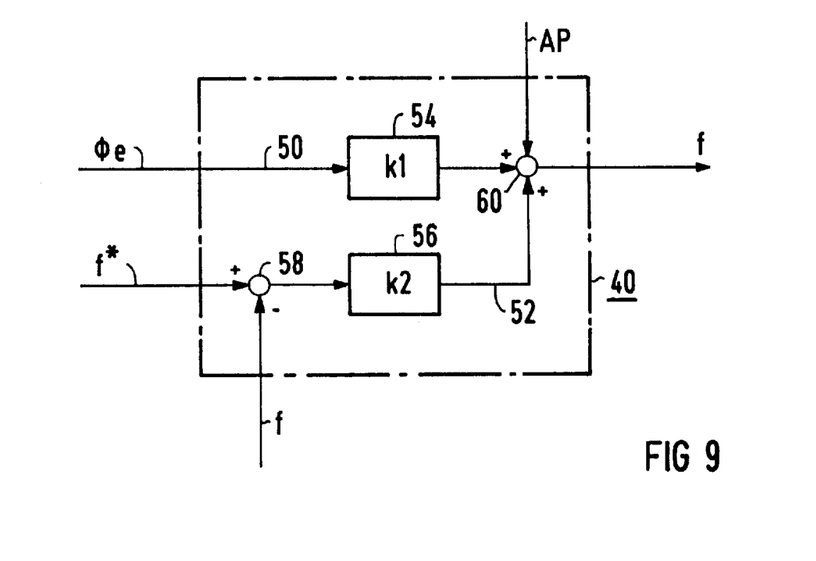
FIG. 9 shows the structure of the working-point controller in a block diagram.
Figure 10:
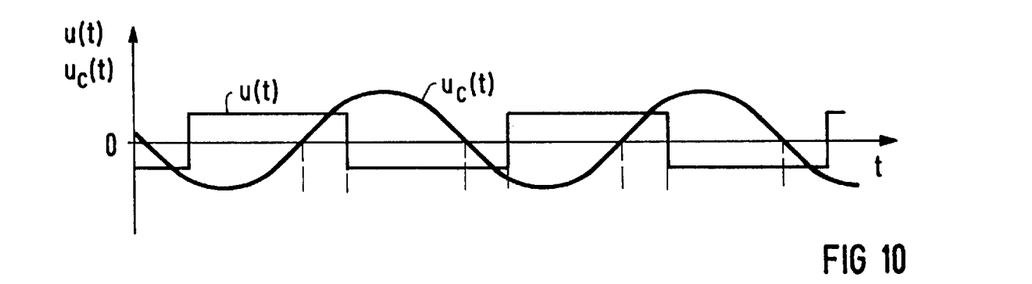
FIG. 10 shows the excitation voltage and the capacitor voltage with respect to time t.

FIG. 9 depicts a block diagram of an embodiment of the working-point controller 40, which is designed as a state controller. This state controller contains first and second proportional elements 54 and 56 in the phase channel 50 and in the frequency channel 52, respectively. Also arranged in the frequency channel 52 is a comparator 58, which compares the frequency value f* of the state variable $u_C$ of the load circuit to the frequency f of the inverter 10. The output signals from the first and second proportional elements 54 and 56 are combined together by means of a summing element 60 to form the frequency f of the inverter 10. Moreover, a working-point precontrol value AP is fed to this summing element 60, since in this case it operates as a state controller. This working-point precontrol value AP assures that the phase channel also works when the system is started up. The frequency channel 52 is merely used for starting the state controller 40 and locking it into the phase-control circuit. This circuit is used to automatically tie the phase angle $\Phi Z$ of the state variable $u_C$ to a phase-angle setpoint value $\Phi^*$ made available by a master power control.

Figure 12:
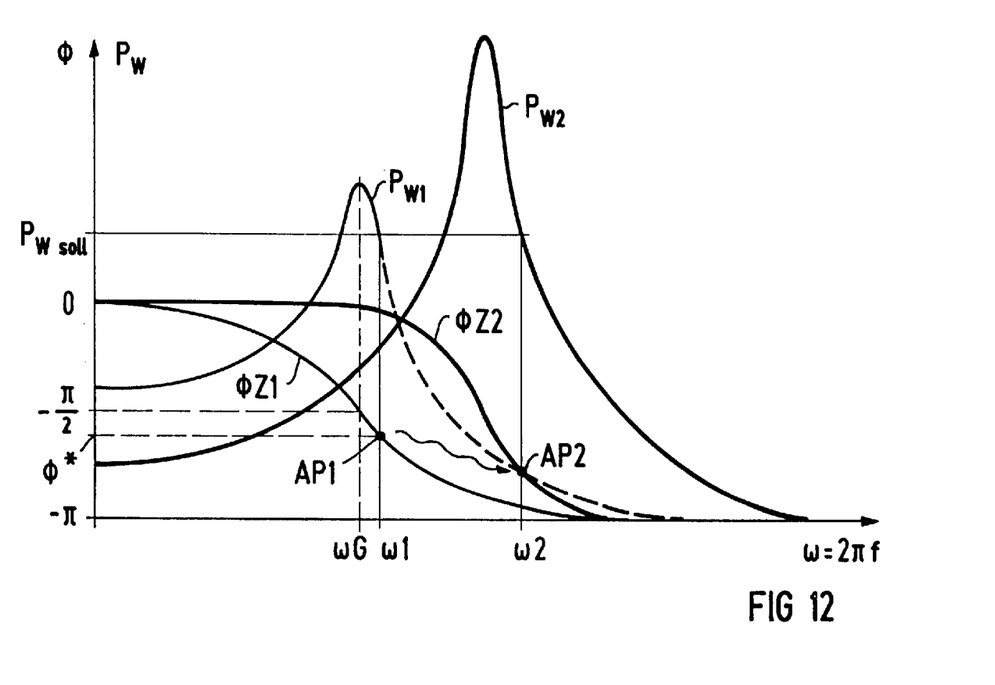
FIG. 12 shows the phase-frequency characteristic of a state variable and the effective power, in the case of altered parameters of the resonant circuit, with respect to the circuit frequency $\omega$.

The working-point controller 40 guarantees the above-resonant operation of the series-resonant-circuit inverter. Accordingly, operating points having a frequency below the phase shift $\Phi Z = -90°$ do not occur as steady-state operating points (see FIG. 12). The working-point precontrol, which is set, for instance, to an operating point AP1, guarantees that the transient oscillation settles into the desired setpoint value $\Phi^*$. When the heating material is introduced or when the Curie temperature is exceeded, the imaginary part of the impedance acting on the inductor terminals drops. The result is an increase in the resonant frequency. This is shown in FIG. 12 by an additional power curve $P_{W2}$ and a corresponding phase-frequency characteristic $\Phi Z2$, this for the same effective power $P_{Wsetpoint}$. In the specified working point AP1, the phase-angle actual value $\Phi Z$ of the state variable $u_C$ is equal to the phase-angle setpoint value $\Phi^*$, which corresponds to a power-setpoint value $P_{Wsetpoint}$. If the electrical performance characteristics of the inductor circuit 14 change, deviations from the adjusted operating point AP1 occur. FIG. 12 clarifies the transition, in the event of parameter fluctuations, between two phase-frequency characteristics $\Phi Z1$ and $\Phi Z2$ of the transformation circuit 12 for the controlled circuit. For the adjusted operating frequency $\omega 1$, altered parameters result in a phase relation of $\Phi^* = \Phi AP1$, which also corresponds to the adjusted phase-angle setpoint value $\Phi^*$. The setpoint-actual-value comparison shows a deviation, which is reduced by the controller 40, until the new working point AP2 is reached. The frequency detuning is caused by a deviation $\Phi e$ of the phase angles $\Phi^*$ and $\Phi Z$ and its amplification by means of the phase channel 50 of the state controller 40.

When the working point is adjusted, above-resonant operation must again be guaranteed in the case of parameter fluctuations. The greatest possible shift in the self-resonance point (in the direction of higher frequencies) results for the smallest possible reactance of the inductor circuit 14 together with the heating material. This case occurs for the smallest possible inductance of the heating material. The phase-angle setpoint value $\Phi^*$, as well as the corresponding operating frequency $\omega 1$, must be adapted so as to allow above-resonant switching to occur when the heating material is removed. The shifting of the self-resonance point to smaller frequencies is usually less important.

In the event of malfunctions, such as inductor short-circuits, large variations in the resonant frequency may occur suddenly. The closed-loop control according to the invention cannot react to such abrupt changes in the load circuit, because the phase detector 42 and the frequency detector 44 each have a smoothing element. Subordinate protective functions prevent dynamic below-resonant switching cycles from occurring in the short-circuit, so that the MOSFETs 30 of the inverter 10 are not destroyed. After elimination of the error, the working point AP1 or AP2 is approached again quickly by means of the closed-loop control according to the invention. This requirement is met by the realization of the controller with first and second proportional elements 54 and 56.

The method according to the invention and a device for implementing this method make it possible for shifts in the self-resonance point to be detected without any errors. This permits the operating range to also accommodate pronounced load changes. By means of this method, when approaching an operating point situated near the self-resonance point of the resonant circuit, overshoots are prevented, so that below-resonant switching does not occur. Thus, there is no departure from the defined operating range. Moreover, in the case of the closed-loop control according to the invention, the controllable rectifier 6 may be no longer needed. In place of this controlled rectifier 6, an uncontrolled rectifier can now be used, through which the controlling system 20 is substantially simplified. The closed-loop control according to the invention now makes it possible for the power of the series-resonant-circuit inverter to be automatically controlled to a predetermined setpoint value through the application of a frequency control, without a great expenditure of time and energy.

What is claimed is:

1. A method for controlling the working points of a series-resonant-circuit inverter, comprising the steps of:
    (a) determining a phase-angle actual value of a measurable state variable of a load circuit, said state variable having a phase-frequency characteristic which is monotonically decreasing;
    (b) setting a value of a phase-angle setpoint in correspondence to said phase-angle actual value;
    (c) defining a phase-angle system deviation based on the phase-angle actual value and the phase-angle setpoint; and
    (d) setting the frequency of an inverter in correspondence with said defined phase-angle system deviation.

2. The method of claim 1, further comprising the step of:
    (e) generating a value of said phase-angle setpoint by a master power control.

3. The method of claim 1, further comprising the step of:
    (f) setting the value of said phase-angle actual value in dependence on a phase difference between the excitation voltage generated by the inverter and said measurable state variable of the load circuit.

4. The method of claim 1, wherein said measurable state variable of the load circuit is a load current of a two-storage system.

5. The method of claim 1, wherein said measurable state variable of the load circuit is a capacitor voltage of a three-storage system.

6. A device for controlling the working points of a series-resonant-circuit inverter, comprising:

a comparator having a negative input, a positive input, and an output;

a working-point controller coupled to the output of said comparator, said working-point controller including a first frequency input, a phase input, a second frequency input, a working-point precontrol input, and an output;

a phase detector having a first input, a second input, and an output, the output of said phase detector coupled to said negative input of said comparator;

a frequency detector having an input and an output, the output of said frequency detector being coupled to said first frequency input of said working-point controller;

a measurable state variable of the load circuit coupled to said second input of said phase detector and to said input of said frequency detector; and an excitation voltage generated by the inverter coupled to said first input of said phase detector.

7. The device of claim 6, wherein said working-point controller is a state controller comprising:

a phase channel with a first proportional element;

a frequency channel with a second proportional element and a working-point precontroller.

8. The device of claim 6, wherein said phase detector is an exclusive OR gate with a subsequent smoothing element.

9. The device of claim 6, wherein said phase detector is a monostable element with a subsequent smoothing element.

10. The device of claim 6, wherein said frequency detector is threshold detector with a subsequent smoothing element.

11. A device for controlling the working points of a series-resonant-circuit inverter, comprising:

a source of three-phase alternating current power;

an intermediate circuit coupled to said source;

an inverter coupled to said intermediate circuit;

a load circuit coupled to said inverter; and means for controlling a frequency of said inverter such that a phase-angle actual value of a measurable state variable of said load circuit corresponds to a specifiable phase-angle setpoint value.

12. The device of claim 11, further comprising a transformer coupled to said source.

13. The device of claim 12, further comprising a rectifier coupled to said transformer.

14. The device of claim 13, wherein said rectifier is uncontrolled.

15. The device of claim 13, further comprising a rectifier controller, such that said rectifier is controlled by said rectifier controller.

16. The device of claim 11, wherein said load circuit includes an inductor.

17. The device of claim 11, wherein a phase-frequency characteristic of said measurable state variable is monotonically decreasing.

18. The device of claim 11, wherein the measurable state variable is a capacitance.

* * * * *